United States Patent
Hsu

(10) Patent No.: US 6,756,474 B2
(45) Date of Patent: Jun. 29, 2004

(54) AQUEOUS CONDUCTIVE DISPERSIONS OF POLYANILINE HAVING ENHANCED VISCOSITY

(75) Inventor: Che-Hsiung Hsu, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 101 days.

(21) Appl. No.: 10/055,669

(22) Filed: Jan. 23, 2002

(65) Prior Publication Data

US 2002/0156232 A1 Oct. 24, 2002

Related U.S. Application Data

(60) Provisional application No. 60/268,152, filed on Feb. 9, 2001.

(51) Int. Cl.[7] .......................... C08G 73/00; H01L 33/00; H01L 29/04; H01B 1/00
(52) U.S. Cl. ....................... 528/422; 528/373; 528/391; 528/480; 528/487; 528/491; 528/499; 524/457; 525/534; 525/535; 525/540; 252/500; 428/209; 428/212; 428/457; 428/690; 428/917; 257/10; 257/40; 257/72; 257/103
(58) Field of Search ................................. 528/422, 373, 528/391, 480, 487, 491, 499; 524/457; 525/534–535, 540; 252/500; 428/209, 212, 457, 690, 917; 257/10, 40, 92, 103

(56) References Cited

U.S. PATENT DOCUMENTS

| | | | |
|---|---|---|---|
| 564,224 A | | 7/1896 | Rose |
| 4,321,114 A | * | 3/1982 | MacDiarmid et al. ........ 205/58 |
| 4,442,187 A | * | 4/1984 | MacDiarmid et al. ...... 429/213 |
| 5,115,057 A | * | 5/1992 | Ono et al. ................... 526/258 |
| 5,160,457 A | * | 11/1992 | Elsenbaumer ............... 252/500 |
| 5,378,403 A | * | 1/1995 | Shacklette ................... 252/500 |
| 5,408,109 A | * | 4/1995 | Heeger et al. ................. 257/40 |
| 5,716,550 A | * | 2/1998 | Gardner et al. ............. 252/500 |
| 5,723,873 A | * | 3/1998 | Yang ............................ 257/40 |
| 5,773,150 A | | 6/1998 | Tong et al. |
| 5,798,170 A | * | 8/1998 | Zhang et al. ................ 428/212 |
| 5,869,350 A | * | 2/1999 | Heeger et al. ................. 438/29 |
| 5,965,281 A | | 10/1999 | Cao |
| 6,018,018 A | | 1/2000 | Samuelson et al. |
| RE37,370 E | * | 9/2001 | Cao et al. .................... 252/500 |
| 6,507,428 B1 | * | 1/2003 | Heuer et al. ................ 359/273 |
| 2003/0146436 A1 | * | 8/2003 | Parker et al. .................. 257/72 |

OTHER PUBLICATIONS

Database WPI, XP–002204460, Polymer Complex Useful Anode Buffer Layer Electroluminescent Element Comprise Polystyrene Type, JP2001106782, Apr. 17, 2001, Derwent Publications Ltd., London GB.

Database WPI, XP–002204461, Non Corrosion Water Disperse Polyaniline Composition Comprise Polyaniline Contain Low Molecular Proton Acid Dope Polystyrene Sulphonic Acid Salt Dispense, JP05262981, Oct. 12, 1993. Derwent Publications Ltd., London GB.

Database WPI, XP–002204462, Electroconducting Polymer Layer Pattern Formation Electrode Plane Forming Negative Image Pattern Plate Insulate Layer Polymerise Organic Compound Area No Cover Insulate, JP62138582, Jun. 22, 1987, Derwent Publications Ltd., London GB.

* cited by examiner

Primary Examiner—P. Hampton Hightower

(57) ABSTRACT

The present invention is generally directed to a polyaniline/high molecular weight polymeric sulfonic acid complex made by oxidative polymerization, and aqueous polyaniline dispersions, where the viscosity of the dispersion has been increased by the presence of the high molecular weight polymeric sulfonic acids during the polymerization process.

30 Claims, 1 Drawing Sheet

AQUEOUS CONDUCTIVE DISPERSIONS OF POLYANILINE HAVING ENHANCED VISCOSITY

This application claims the benefits of Provisional Appilcation Ser. No. 60/268,152 filed Feb. 9, 2001.

BACKGROUND OF THE INVENTION

This invention relates to aqueous conductive polyaniline dispersions having enhanced viscosity. It also relates to electronic devices including layers made from such polyaniline dispersions.

Electrically conductive polymers have been found to be useful in electronic devices such as light-emitting diodes (LEDs), photodetectors and photovoltaic cells. It is well known to use a layer of conductive polymer, such as polyaniline (PANI), between the inorganic anode and the light-emitting or photosensitive layer. The conductive polymer layer is referred to variously as part of a bilayer anode, a hole-injection layer or a buffer layer. Such systems have been described in, for example, Yang, U.S. Pat. No. 5,723, 873.

Useful synthetic procedures for the preparation of polyanilines are well known. For example, the aniline monomer can be treated with ammonium persulfate in excess hydrochloric acid in water. Other chemical procedures have been described in detail in Green, A. G., and Woodhead, A. E., "Aniline-black and Allied Compound, Part 1, " *J. Chem. Soc.,* 101, pp. 1117 (1912); and in U.S. Pat. Nos. 4,442,187, 4,321,114, and 5,160,457. The resulting polyaniline can have a variety of chemical forms. For the unsubstituted polyanilines, these are referred to as the leucoemeraldine, protoemeraldine, emeraldine, nigraniline, and toluprotoemeraldine forms. In the presence of excess acid in water, the nitrogens of the polyaniline can be protonated to form a salt. Another useful synthetic method based on oxidative polymerization for preparation of polyanilines is enzymatic template polymerization disclosed in U.S. Pat. No. 6,018,018.

The thickness of the PANI layer needed depends to some extent on the surface roughness of the metallic conductive layer. Thicker layers are needed as the surface roughness increases. In order to prepare layers of increased thickness, it is desirable to have dispersions of PANI with high viscosity. Moreover, to reduce cost, it is desirable to have increased viscosity at low solids concentration.

SUMMARY OF THE INVENTION

The present invention is directed to a polyaniline/second polymer complex made by polymerizing anilines, each of the anilines having Formula I below, by oxidation in aqueous solution in the presence of a high molecular weight second polymer having a polymeric unit with at least one sulfonic acid group, having Formula II below.

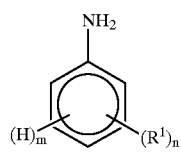
(I)

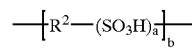
(II)

where in Formula I:
n is an integer from 0 to 4;
m is an integer from 1 to 5, with the proviso that n+m=5; and
$R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms; and in Formula II:
$R^2$ is a polymeric unit selected from styrene, substituted styrene, vinyls, vinyl aromatics, acrylates, methacrylates, and combinations thereof;
a is an integer from about 1 to about 10; and
b is a number sufficient to give a molecular weight greater than 100,000.

The present invention is directed to a composition including a polyaniline complexed with a second polymer having a high molecular weight, the polyaniline comprising aniline monomer units, each of the aniline monomer units having a formula selected from Formula III below and Formula IV below, the second polymer having Formula II above:

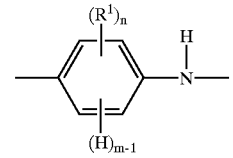
(III)

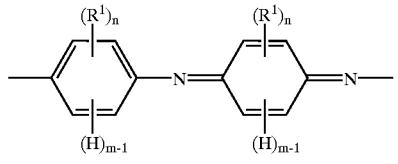
(IV)

Where in Formula III and Formula IV:
n is an integer from 0 to 4;
m is an integer from 1 to 5, with the proviso that n+m=5; and
$R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms.

The present invention is also directed to a method for the preparation of an aqueous dispersion of polyaniline, wherein aniline monomers are polymerized by oxidation in aqueous solution in the presence of a high molecular weight second polymer having a polymeric unit with at least one sulfonic acid group. The second polymer is selected from styrene and substituted styrene sulfonic acid polymers; sulfonated vinylaromatic polymers; vinyl sulfonic acid polymers; sulfonated acrylate polymers; sulfonated methacrylate polymers and their copolymers. It should be noted that the high molecular weight second polymer having a polymeric unit with at least one sulfonic acid group can be used as templates in enzymatic polymerization. In another embodiment, the present invention is directed to an organic electronic device having at least one layer including the polyaniline/second polymer complex described above.

As used herein, the term "polyaniline" is intended to include polymers made from substituted and unsubstituted aniline monomers, unless the context is clear that only the specific non-substituted form is intended.

DETAILED DESCRIPTION OF THE PREFERRED EMBODIMENTS

Figure 1:
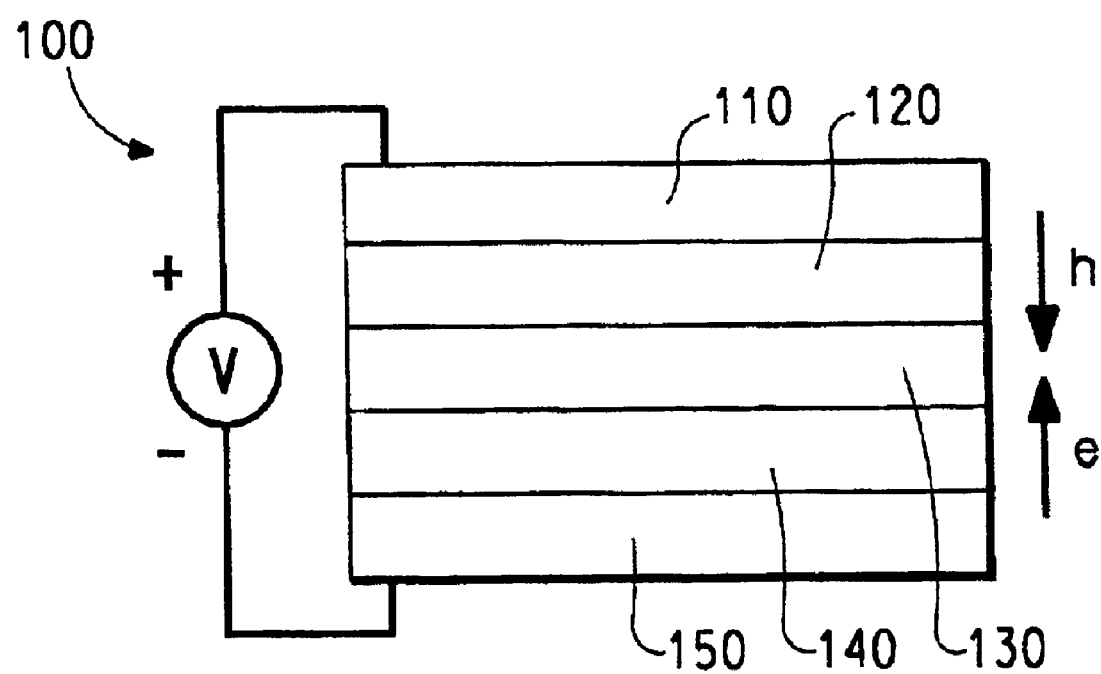
FIG. 1 is a schematic diagram of an organic electronic device.

The electrically conductive polyanilines of the present invention are those formed by oxidative polymerization of aniline monomers, which may be substituted with alkyl, aryl, heteroalkyl or heteroaryl groups. Combinations of monomers can also be used.

The polyaniline can be in any of its physical forms. It is well known that different forms of polyaniline polymers can be made, depending upon the degree of oxidation. Polyaniline polymers can generally be described as being made up of monomer units having amine nitrogens, as in Formula III above, and/or imine nitrogens, as in Formula IV above. Although the formulae show the monomer units in the unprotonated form, it is known that in the presence of an acid, the basic nitrogens will be protonated to form a salt. The relative proportion of imine nitrogens to amine nitrogens increases with increasing oxidation. A preferred polyaniline is the emeraldine base form in which the ratio of monomer units having Formula III to those having Formula IV, is 2:1. In this preferred polymer the ratio of amine nitrogens to imine nitrogens is 1:1.

In the present invention, the desired polyaniline is formed by oxidative polymerization of the corresponding aniline monomers in aqueous solution in the presence of the high molecular weight second polymer having a polymeric unit with at least one sulfonic acid group. In a first embodiment, the oxidative polymerization of aniline is carried out with an oxidizing agent such as ammonium persulfate and the second polymer. In a second embodiment, the oxidative polymerization of aniline is carried with an enzyme, such as peroxidases (for example, horseradish peroxidase, soy bean peroxidase), and the second polymer, wherein the reaction is initiated by an initiator such hydrogen peroxide, the so called "enzymatic template polymerization," as described in U.S. Pat. No. 6,018,018, the content of which is incorporated herein by reference. An aqueous dispersion or solution of the second polymer is added to the monomer solution prior to initiation of polymerization.

The basic nitrogens of the polyanine are protonated by the sulfonic acid groups of the second polymer resulting in the formation of an acid-base ion pair complex, referred to herein as the PANI/second polymer complex. When the polyaniline is in the emeraldine base form, the two imine nitrogens are protonated to form the complex. This PANI/second polymer complex can be used to form aqueous dispersions having increased viscosity. As used herein, the term "dispersion" is intended to mean a liquid containing a suspension of minute particles, and may approach a true solution in which the particles are dissolved in the liquid.

Useful aniline monomers can be unsubstituted or substituted aniline monomers having Formula I above.

Combinations of monomers can also be used. A preferred polyaniline is unsubstituted polyaniline. In general, the number of polymeric units in the polymer is at least about 50.

To obtain useful polyaniline for the present invention, the polymerization of the aniline monomers is carried out in aqueous solution in the presence of a second high molecular weight polymer having a polymeric unit with at least one sulfonic acid group. The high molecular weight second polymer may be a homopolymer resulting from the polymerization of monomer units with at least one sulfonic acid group. It may also be a copolymer of at least one set of monomer units with at least one sulfonic acid group, and may include other monomer units with no sulfonic acid group. By "high molecular weight" is meant a material having a weight average molecular weight greater than 100,000. Preferably, the molecular weight is in the range of 300,000 to 900,000. The second polymer has a Formula II above Examples of suitable homopolymers suitable as the second polymer include poly(styrenesulfonic acid), poly(2-methylstyrene sulfonic acid), poly(4-phenylstyrene sulfonic acid), and sulfonated poly(alpha-vinyl naphthalene); poly (vinyl sulfonic acid); sulfonated poly(vinyl benzoate); sulfonated poly(benzyl acrylate) and sulfonated poly(benzyl methacrylate). A preferred second polymer is poly(styrene sulfonic acid). It should be understood that the monomer units do not need to be completely sulfonated. Examples of suitable copolymers useful as the second polymer include poly(styrene/2-methylstyrene sulfonic acid), poly(styrene/vinyl sulfonic acid), and poly(styrene/vinyl/2-methylstyrene sulfonic acid). It should be understood that the monomers units do not need to be completely sulfonated.

The resulting composition is a polyaniline/second polymer complex wherein the polyaniline includes aniline monomer units, each having a formula selected from Formula III above and Formula IV above, complexed with a second polymer having a high molecular weight, the second polymer having Formula II above. As discussed above, the basic nitrogens in the polyaniline polymer are protonated by the sulfonic acid groups of the second polymer to form an ion pair complex.

Preferably, the PANI/second polymer complex is isolated from the reaction mixture. The isolated complex can then be added to water at the desired concentration to form a dispersion suitable for coating. A 1% by weight dispersion of PANI/second polymer complex in water, based on the total weight of the dispersion, will have a viscosity of at least 50 centipoise (cp) at a shear rate of $10s^{-1}$.

The present invention also relates to an electronic device comprising an organic active layer sandwiched between two electrical contact layers, wherein a layer containing the PANI/second polymer complex of the invention is positioned between the active layer and the electrical contact layer which functions as an anode. A typical structure is shown in FIG. 1. The device 100 has an inorganic anode layer 110 and a cathode layer 150. Adjacent to the anode is a layer 120 comprising the PANI/second polymer complex made by the method of the present invention. Adjacent to the cathode is an optional layer 140 comprising an electron transport material. Between the PANI layer 120 and the cathode (or optional electron transport layer) is the organic active layer 130.

The device generally also includes a support, which can be adjacent to the anode or the cathode. Most frequently, the support is adjacent the inorganic anode. The support can be flexible or rigid, organic or inorganic. Generally, glass or flexible organic films are used as a support.

The inorganic anode 110 is an electrode that is particularly efficient for injecting or collecting positive charge carriers. The anode can be made of materials containing a metal, mixed metal, alloy, metal oxide or mixed-metal oxide. Suitable metals include the Group 11 metals, the metals in Groups 4, 5, and 6, and the Group 8-10 transition metals. If the anode is to be light-transmitting, mixed-metal oxides of Groups 12, 13 and 14 metals, such as indium-tin-oxide, are generally used. The IUPAC numbering system is used throughout, where the groups are numbered from left to right as 1–18 (CRC Handbook of Chemistry and Physics, $81^{st}$ Edition, 2000).

The inorganic anode layer is usually applied by a physical vapor deposition process. The term "physical vapor deposition" refers to various deposition approaches carried out in vacuo. Thus, for example, physical vapor deposition includes all forms of sputtering, including ion beam sputtering, as well as all forms of vapor deposition such as e-beam evaporation. A specific form of physical vapor deposition which is useful is rf magnetron sputtering.

The PANI/second polymer layer can be applied using any conventional means, including spin-coating, casting, and printing, such as gravure printing. The PANI can also be applied by ink jet printing or thermal transfer patterning. Before application, the PANI/second polymer complex can be added to water to form the aqueous dispersion of the invention. Alternatively, the PANI/second polymer complex can be dispersed or dissolved in organic polar solvents or non-polar solvents. In general, the concentration of the aqueous dispersion is in the range of 0.1 to 5.0% by weight of the PANI/second polymer complex, based on the total weight of the dispersion; preferably 0.5–2.0% by weight. Because of the increased viscosity of the dispersions of the PANI/second polymer complexes of the invention, it is possible to apply thicker layers in a single coating at low polymer loadings. The conductivity of the layer is generally in the range of $10^{-8}$ to 10 S/cm.

In general, the inorganic anode and the PANI/second polymer layer will be patterned. It is understood that the pattern may vary as desired. The layers can be applied in a pattern by, for example, positioning a patterned mask or photoresist on the first flexible composite barrier structure prior to applying the first electrical contact layer material. Alternatively, the layers can be applied as an overall layer and subsequently patterned using, for example, a photoresist and wet chemical etching. As discussed above, the PANI/second polymer layer can be applied in a pattern by ink jet printing or thermal transfer patterning. Other processes for patterning that are well known in the art can be used.

Depending upon the application of the device 100, the active layer 130 can be a light-emitting layer that is activated by an applied voltage (such as in a light-emitting diode), a layer of material that responds to radiant energy and generates a signal with or without an applied bias voltage (such as in a photodetector). Examples of photodetectors include photoconductive cells, photoresistors, photoswitches, phototransistors, and phototubes, and photovoltaic cells, as these terms are describe in Markus, John, *Electronics and Nucleonics Dictionary*, 470 and 476 (McGraw-Hill, Inc. 1966).

Where the active layer is light-emitting, the layer will emit light when sufficient bias voltage is applied to the electrical contact layers. The light-emitting active layer may contain any organic electroluminescent or other organic light-emitting materials. Such materials can be small molecule materials such as those described in, for example, Tang, U.S. Pat. No. 4,356,429, Van Slyke et al., U.S. Pat. No. 4,539,507, the relevant portions of which are incorporated herein by reference. Alternatively, such materials can be polymeric materials such as those described in Friend et al. (U.S. Pat. No. 5,247,190), Heeger et al. (U.S. Pat. No. 5,408,109), Nakano et al. (U.S. Pat. No. 5,317,169), the relevant portions of which are incorporated herein by reference. Preferred electroluminescent materials are semiconductive conjugated polymers. An example of such a polymer is poly(p-phenylenevinylene) referred to as PPV. The light-emitting materials may be dispersed in a matrix of another material, with and without additives, but preferably form a layer alone. The active organic layer generally has a thickness in the range of 50–500 nm.

Where the active layer is incorporated in a photodetector, the layer responds to radiant energy and produces a signal either with or without a biased voltage. Materials that respond to radiant energy and is capable of generating a signal with a biased voltage (such as in the case of a photoconductive cells, photoresistors, photoswitches, phototransistors, phototubes) include, for example, many conjugated polymers and electroluminescent materials. Materials that respond to radiant energy and is capable of generating a signal without a biased voltage (such as in the case of a photoconductive cell or a photovoltaic cell) include materials that chemically react to light and thereby generate a signal. Such light-sensitive chemically reactive materials include for example, many conjugated polymers and electro- and photo-luminescent materials. Specific examples include, but are not limited to, MEH-PPV ("Optocoupler made from semiconducting polymers", G. Yu, K. Pakbaz, and A. J. Heeger, *Journal of Electronic Materials*, Vol. 23, pp 925–928 (1994); and MEH-PPV Composites with CN-PPV ("Efficient Photodiodes from Interpenetrating Polymer Networks", J. J. M. Halls et al. (Cambridge group) *Nature* Vol. 376, pp. 498–500, 1995).

The active layer 130 containing the active organic material can be applied from solutions by any conventional means, including spin-coating, casting, and printing. The active organic materials can be applied directly by vapor deposition processes, depending upon the nature of the materials. It is also possible to apply an active polymer precursor and then convert to the polymer, typically by heating.

The cathode 150 is an electrode that is particularly efficient for injecting or collecting electrons or negative charge carriers. The cathode can be any metal or nonmetal having a lower work function than the first electrical contact layer (in this case, an anode). Materials for the second electrical contact layer can be selected from alkalil metals of Group 1 (e.g., Li, Cs), the Group 2 (alkaline earth) metals, the Group 12 metals, the rare earths, the lanthanides, and the actinides. Materials such as aluminum, indium, calcium, barium, and magnesium, as well as combinations, can be used.

The cathode layer is usually applied by a physical vapor deposition process. In general, the cathode layer will be patterned, as discussed above in reference to the anode layer 110 and PANI layer 120. Similar processing techniques can be used to pattern the cathode layer.

Optional layer 140 can function both to facilitate electron transport, and also serve as a buffer layer or confinement layer to prevent quenching reactions at layer interfaces. Preferably, this layer promotes electron mobility and reduces quenching reactions. Examples of electron transport materials for optional layer 140 include metal chelated oxinoid compounds, such as tris(8-hydroxyquinolato) aluminum ($Alq_3$); phenanthroline-based compounds, such as 2,9-dimethyl-4,7-diphenyl-1,10-phenanthroline (DDPA) or 4,7-diphenyl-1,10-phenanthroline (DPA), and azole compounds such as 2-(4-biphenylyl)-5-(4-t-butylphenyl)-1,3,4-oxadiazole (PBD) and 3-(4-biphenylyl)-4-phenyl-5-(4-t-butylphenyl)-1,2,4-triazole (TAZ).

It is known to have other layers in organic electronic devices. For example, there can be a layer (not shown) between the PANI layer 120 and the active layer 130 to facilitate positive charge transport and/or band-gap matching of the layers, or to function as a protective layer. Similarly, there can be additional layers (not shown) between the active layer 130 and the cathode layer 150 to facilitate negative charge transport and/or band-gap matching between the layers, or to function as a protective layer. Layers that are known in the art can be used. In addition, any of the above-described layers can be made of two or more layers. Alternatively, some or all of inorganic anode layer 110, the PANI layer 120, the active layer 130, and cathode layer 150, may be surface treated to increase charge carrier transport efficiency. The choice of materials for each of the component layers is preferably determined by balancing the goals of providing a device with high device efficiency.

The device can be prepared by sequentially depositing the individual layers on a suitable substrate. Substrates such as glass and polymeric films can be used. In most cases the anode is applied to the substrate and the layers are built up from there. However, it is possible to first apply the cathode to a substrate and add the layers in the reverse order. In general, the different layers will have the following range of thicknesses: inorganic anode 110, 500–5000 Å, preferably 1000–2000 Å; PANI layer 120, 50–2500 Å, preferably 200–2000 Å; light-emitting layer 130, 10–1000 Å, preferably 100–800 Å; optional electron transport layer 140, 50–1000 Å, preferably 200–800 Å; cathode 150, 200–10000 Å, preferably 300–5000 Å.

EXAMPLES

The following examples illustrate certain features and advantages of the present invention. They are intended to be illustrative of the invention, but not limiting. All percentages are by weight, unless otherwise indicated.

Viscosity Measurements

Viscosity of the aqueous dispersions was obtained with an AR1000-N rheometer from TA Instruments. The gap, where liquid sample was placed in, between two parallel plates was set at 50 micrometers. Different shear rates were achieved by varying the upper plate velocity.

Example 1

This example illustrates the preparation of high molecular weight poly(styrene sulfonic acid) (HMW-PSSA).

Poly(styrene sulfonic acid) (PSSA) is available commercially, but the highest available molecular weight is about 70,000. High molecular weight PSSA was formed from the sodium salt.

A sodium poly(styrene sulfonate) salt having a molecular weight of approximately 500,000 (available from Polysciences, Warrington, Pa.), was dissolved in water at about 2.5 weight %. The solution was then eluted through Amberlyst® 15 acid resin, packed in a glass column, from Supelco for conversion of sulfonic acid sodium salt to acid. Before the elution, the Amberlyst resin while in the column was washed with nano-pure water until there was no color in the eluted water. The eluted polymer solution was dried and checked with I.R. to ascertain complete conversion from sodium salt to acid before concentrated by a Rotovap® to 17.86 weight % (Sample 1-1) or 24.95 weight % (Sample 1-2). The molecular weight of the HMW-PSSA, after correction for sodium, was about 450,000.

Example 2

This example illustrates the process of the invention using unsubstituted aniline and high molecular weight poly (styrene sulfonic acid).

3.9 g distilled aniline was first dissolved in a 144 ml aqueous solution containing 6.9 g of HMW-PSSA Sample 1-1. The solution was placed in a 4-necked 500 ml round bottomed flask and first cooled down to ~4° C. with an ice/water mixture. The solution was stirred constantly with an air-driven overhead stirrer. To the chilled aqueous solution of aniline and HMW-PSSA, a 96 ml aqueous solution containing 4.6 g HMW-PSSA and 2.22 g ammonium persulfate was slowly added to the aniline solution in one hour at a constant rate. The temperature increased to 3.6° C. at the height of the exothermic reaction, but stayed below 3° C. during the duration of polymerization.

The reaction mixture was then poured into 2 centrifuge bottles. Visual observation showed fairly high viscosity. Remnants of the reaction mixture were rinsed with distilled water with the rinsings being poured into one of the bottles. The bottles were then balanced with each other with the final 0.34 g being made up with distilled water. This was then centrifuged at 8000 RPM at 15° C. for 30 minutes. A very small amount of a tarry product had collected along the side of the centrifuge bottles, which was discarded. The contents of the centrifuge bottles were combined by pouring into a separatory funnel to drip the supernate into a 4 liter beaker that contained 3 liter of acetone with the agitation being provided by an air-driven overhead stirrer. Precipitation was performed in 2 parts. Results of the Precipitation revealed a tarry, feathery, squishy solid. The mother liquor was opaque and a greenish color. The mother liquor was decanted, leaving behind the tarry, squishy solid. The squishy solid was rinsed with Acetone from a squirt bottle and was then placed in an Erlenmeyer flask containing about 500 ml acetone. It was then stirred magnetically. The solid became harder and the particle size was reduced as water was removed by the acetone. Each precipitate was treated identically. They were combined and 500 ml fresh acetone was added for further purification with a continuos stirring for 3 hours. It was let sit undisturbed until solids settled on the bottom. The mother liquor was greenish and decanted. 500 ml fresh acetone was added and was stirred for about 12 hours. It was let sit undisturbed again until solids settled on the bottom. The mother liquor was still greenish, but lighter. It was decanted and 500 ml fresh acetone was added again and was stirred for about 12 hours again. The slurry was filtered through a Buchner Funnel equipped with Whatman® Number 4 Filter Paper. The filtrate was clear and colorless. The collected solids were rinsed with acetone a couple times. The funnel, still containing the filter cake, was then placed into a vacuum oven (–18 inches Hg., $N_2$ bleed, ambient temperature) overnight. The dried solid PANI/HMW-PSSA weighed 8.52 g.

Appropriate amounts of the PANI/HWM-PSSA complex synthesized above were added to distilled water with stirring to form a 1.0 wt. % aqueous dispersion (Example 2-1) and a 2.0 wt. % aqueous dispersion (Example 2-2). Viscosities of the aqueous dispersions are given in Table 1, for 10, 100, 1000, and 10000 $S^{-1}$ shear rates.

Comparative Example A

This example illustrates the viscosity of solutions of unsubstituted polyaniline made with conventional, low molecular weight poly(styrene sulfonic acid).

4.1 g distilled aniline was first dissolved in a 60 ml aqueous solution containing 7.26 g low molecular weight PSSA (L-PSSA). The L-PSSA was obtained from PolySciences in the form of 30 wt. % aqueous solution. Molecular weight of the L-PSSA is listed as 70,000. The aniline/L-PSSA solution in a 250 ml Erlenmeyer flask was first cooled down to ~4° C. with an ice/water mixture. The solution was stirred constantly with a magnetic stirrer. To the chilled aqueous aniline/L-PSSA solution, a 40 ml aqueous solution containing 4.84 g PSSA and 2.31 g ammonium persulfate was slowly added to the aniline solution in one hour at a constant rate. The temperature increased to 3.6° C. at the height of the exothermic reaction, but stayed below 3° C. during the duration of polymerization.

The reaction mixture was then poured into a centrifuge bottle. It was then centrifuged at 8000 RPM at 15° C. for 30 minutes. Supernate of the centrifuged mixture was poured into a 250 ml Separatory funnel to drip the supernate into a 4 liter beaker that contained 3 liter of Acetone with the agitation being provided by an Air-Driven Overhead Stirrer. Result of the Precipitation revealed a tarry, feathery, squishy solid. The mother liquor was opaque and greenish in color. Once all of the supernate was precipitated, the resulting slurry was allowed to stand for about an hour. The mother liquor was decanted, leaving behind the tarry, squishy solid. The squishy solid was rinsed with Acetone and then placed in an Erlenmeyer containing about 250 ml acetone for further purification with a continuous magnetic stirring for about 12 hours. The solid became harder and the size of the solids was being reduced as water was being removed by the Acetone. The slurry was filtered through a Buchner Funnel equipped with Whatman® Number 4 Filter Paper. The filtrate was clear and colorless. Some larger chunk of solids were "fished out" with a spatula and ground with a mortar & Pestle in the presence of Acetone. These were then replaced into the filter and rewashed with more Acetone. This was then redispersed in ~150 ml of fresh Acetone and allowed to stir for 4 hours. It was let sit undisturbed until solids settled on the bottom. The mother liquor was greenish and decanted. 250 ml fresh acetone was added and stirred for 12 hours. The slurry was filtered through a Buchner Funnel equipped with Whatman® number 4 filter paper. The solids were rinsed with acetone couple times. The funnel, still containing the filter cake, was then placed under a nitrogen blanket through an inverted funnel attached to a hose. This remained there for a couple of hours before the funnel was placed into a vacuum oven (~18 Hg., $N_2$ bleed, ambient temperature) overnight.

Appropriate amounts of the PANI/L-PSSA complex synthesized above were added to distilled water with stirring to form a 5.0 wt. % aqueous dispersion (Comparative A-1). A portion of Comparative A-1 was diluted with appropriate amounts of distilled water to form a 1.0 wt. % aqueous dispersion (Comparative A-2). Viscosities of the aqueous dispersions are given in Table 1, for 10, 100, 1000, and 10000 $S^{-1}$ shear rates.

Comparative Example B

This example illustrates the effect of adding high molecular weight PSSA to dispersions of polyaniline synthesized with low molecular weight PSSA.

Appropriate amounts of the 5 wt % aqueous PANI/L-PSSA solution, A-1, and the 24.95 weight % solution of high molecular weight PSSA. Sample 1-1, were mixed to form the following Comparative B-1 and B-2 dispersions:

|  | weight % PANI/L-PSSA | weight % HMW-PSSA |
|---|---|---|
| Comparative B-1 | 1.0 | 1.6 |
| Comparative B-2 | 1.0 | 2.6 |

The viscosities of the aqueous dispersions are given in Table 1.

Comparative Example C

This example illustrates the viscosity of commercial polyaniline solutions.

An aqueous polyaniline, D1002 W purchased from Ormecon Company (Germany) was first analyzed for I.R. and solid content. I.R showed distinct peaks (1718, 1600, 2828 and 3407 $cm^{-1}$) for PSSA. Solid content was determined to be 3.0 wt. % by the difference before and after drying in a dry nitrogen stream.

Comparative C-1 was the solution as obtained at 3.0 weight %. Comparative C-2 was diluted with distilled water to 1.0 weight %. The viscosities of these samples are given in Table 1.

Comparative Example D

This example illustrates the viscosity of commercial polyaniline solutions with added high molecular weight PSSA.

Appropriate amounts of the commercial 3.0 weight % Ormecon D1002 W polyaniline and the aqueous 17.86 weight % HMW-PSSA solution, Sample 1-1, were mixed to form the following dispersions:

|  | weight % PANI | weight % HMW-PSSA |
|---|---|---|
| Comparative D-1 | 1.0 | 1.6 |
| Comparative D-2 | 1.0 | 2.6 |

The viscosities of the aqueous dispersions are given in Table 1.

TABLE 1

Viscosity of Aqueous Conductive Polyaniline Dispersions

| Sample | Viscosity (cp) | | | |
|---|---|---|---|---|
| | 10 $s^{-1}$ | 100 $s^{-1}$ | 1000 $s^{-1}$ | 10000 $s^{-1}$ |
| Example 2-1 | (76.7) | (38.7) | (20.5) | (10.0) |
| Example 2-2 | (190.0) | (91.5) | (43.2) | (19.5) |
| Comparative A-1 | 3.6 | 3.1 | 2.8 | 2.6 |
| Comparative A-2 | 1.8 | 1.6 | 1.3 | 1.3 |
| Comparative B-1 | 7.0 | 5.4 | 5.3 | 4.7 |
| Comparative B-2 | 11.7 | 8.1 | 7.6 | 6.9 |
| Comparative C-1 | 4.5 | 1.9 | 1.8 | 1.7 |
| Comparative C-2 | 2.4 | 1.3 | 1.2 | 1.1 |
| Comparative D-1 | 8.2 | 7.8 | 7.3 | 6.1 |
| Comparative D-2 | 15.4 | 13.5 | 12.8 | 10.3 |

It is clear from the above comparison that addition of HMW-PSSA prior to the polymerization of the aniline, dramatically increases the viscosity of PANI/PSSA dispersions. At lower shear rates, the viscosity at total 1.0 weight % solid for the PANI/HMW-PSSA of the invention (Example 2-1) is much higher than the viscosity of PANI dispersions with a higher level of HMW-PSSA added after polymerization (Comparative B-2). These examples demonstrate that use of high molecular weight PSSA in the synthesis of conductive PANI/PSSA is a very effective method for enhancing viscosity.

Example 3

This example illustrates the use of the PANI/HMW-PSSA of the invention in a light-emitting diode. Thin film devices consisted of the following components: an inorganic anode, a layer of PANI made according to the method of the invention, an electroluminescent layer (EL layer), and a cathode. All film thicknesses were measured by a TENCOR 500 Surface Profiler.

A substrate of indium tin oxide (ITO) on glass was used, having an ITO thickness of about 1000 to 1500 Å. The ITO was cleaned by plasma treatment. An aqueous dispersion of 2.0 wt. % PANI/HMW-PSSA synthesized according to the method described in Example 2-1 was spin coated on the ITO/glass substrates at a spinning speed of 1400 rpm. The PANI/HMW-PSSA layer average thickness was about 140 nm. The PANI/HMW-PSSA coated ITO/glass substrates were dried in nitrogen at 90° C. for 30 minutes. For the EL layer, the PANI/HMW-PSSA layer was then top-coated with a super-yellow emitter (PDY 131), which is a poly (substituted-phenylene vinylene) from Covion Company (Frankfurt, Germany). The thickness of the EL layer was approximately 700 Å.

For the cathode, Ba and Al layers were vapor deposited on top of the EL layers under a vacuum of $1 \times 10^{-6}$ torr. The final thickness of the Ba layer was 30 Å; the thickness of the Al layer was 3000 Å. Device performance was tested inside a dry box. For each of the devices, the current vs. voltage curve, the light emission intensity vs voltage curve, and the efficiency were measured with a Keithley 236 source-measure unit from Keithley Instrument Inc. (Cleveland, Ohio), and a S370 Optometer with a calibrated silicon photodiode from UDT Sensor, Inc. (Hawthorne, Calif.).

The devices had an average voltage of 5.0 volt, an average efficiency of 6.8 cd/A and an average luminous efficiency of 4.2 Lm/W at an applied current of 8.3 mA/cm².

What is claimed is:

1. A process for making a polyaniline/second polymer complex comprising the steps of:

(a) forming an aqueous solution combining a plurality aniline monomers, each of the aniline monomers having Formula I below, and a second polymer having a high molecular weight, the second polymer having Formula II below:

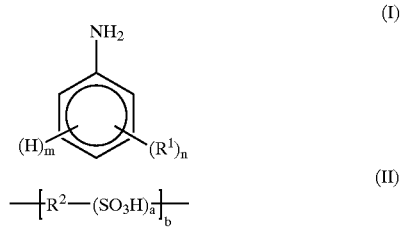

where in Formula I:
   n is an integer from 0 to 4;
   m is an integer from 1 to 5, with the proviso that n+m=5; and
   $R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms;

and where in Formula II:
   $R^2$ is a polymeric unit selected from styrene, substituted styrene, vinyls, vinyl aromatics, acrylates, methacrylates, and combinations thereof;
   a is an integer from about 1 to about 10; and
   b is a number sufficient to give a molecular weight greater than 100,000; and (b) adding an oxidizing agent to the aqueous solution to form a reaction mixture.

2. The process of claim 1, wherein the second polymer is selected from styrene and substituted styrene sulfonic acid polymers; sulfonated vinylaromatic polymers; vinyl sulfonic acid polymers; sulfonated acrylate polymers; sulfonated methacrylate polymers and copolymers on or more of styrene and substituted styrene sulfonic acid polymers; sulfonated vinylaromatic polymers; vinyl sulfonic acid polymers; sulfonated acrylate polymers; sulfonated methacrylate polymers.

3. The process of claim 1, wherein the second polymer is selected from poly(styrenesulfonic acid), poly(2-methylstyrene sulfonic acid), poly(4-phenylstyrene suifonic acid), and sulfonated poly(alpha-vinyl naphthalene); poly (vinyl sulfonic acid); sulfonated poly(vinyl benzoate); sulfonated poly(benzyl acrylate) and sulfonated poly(benzyl methacrylate).

4. The process of claim 1, wherein the second polymer is poly(styrene sulfonic acid).

5. The process of claim 1, wherein second polymer is selected from poly(styrene2-methylstyrene sulfonic acid), poly(styrene/vinyl sulfonic acid), and poly(styrene/vinyl2-methylstyrene sulfonic acid).

6. The process of claim 1, wherein the oxidizing agent is ammonium persulfate.

7. The process of claim 1, wherein the aqueous solution further comprises an enzyme.

8. The process of claim 7, wherein the enzyme is a peroxidase selected from horseradish peroxidase and soy bean peroxidase.

9. The process of claim 8, wherein the oxidizing agent is hydrogen peroxide.

10. The process of claim 1, further comprising the step of:
(c) isolating a resulting polyaniline/second polymer complex from the reaction mixture.

11. A process for forming an aqueous dispersion of polyaniline complex, the process comprising the steps of:
(a) forming an aqueous solution combining a plurality aniline monomers, each having Formula I below, and a second polymer having a high molecular weight, the second polymer having Formula II below:

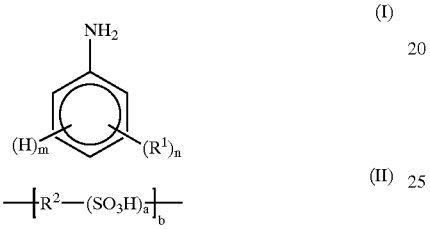

where in Formula I:
n is an integer from 0 to 4;
m is an integer from 1 to 5, with the proviso that n+m=5; and
$R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms;
and where in Formula II:
$R^2$ is a polymeric unit selected from styrene, substituted styrene, vinyls, vinyl aromatics, acrylates, methacrylates, and combinations thereof;
a is an integer from about 1 to about 10; and
b is a number sufficient to give a molecular weight greater than 100,000;
(b) adding an oxidizing agent to the aqueous solution to form a reaction mixture;
(c) isolating a resulting polyaniline/second polymer complex from the reaction mixture; and
(d) adding water to the resulting polyaniline/second polymer complex from step (c) to form a dispersion of a desired concentration.

12. A composition comprising a polyaniline complexed with a second polymer having a high molecular weight, the polyaniline comprising aniline monomer units, each of the aniline monomer units having a formula selected from Formula III below and Formula IV below, the second polymer having Formula II below:

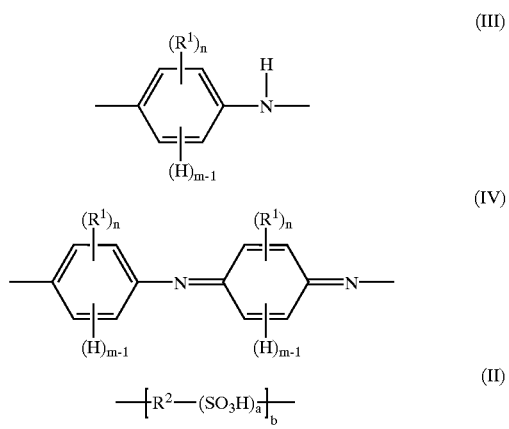

where in Formulae III and IV:
n is an integer from 0 to 4;
m is an integer from 1 to 5, with the proviso that n+m=5; and
$R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms;
and where in Formula II:
$R^2$ is a polymeric unit selected from styrene, substituted styrene, vinyls, vinyl aromatics, acrylates, methacrylates, and combinations thereof;
a is an integer from about 1 to about 10; and
b is a number sufficient to give a molecular weight greater than 100,000.

13. The composition of claim 12, wherein the composition is an aqueous dispersion having a concentration of 0.1 to 5.0% by weight of the polyaniline/second polymer complex, based upon the total weight of the aqueous dispersion.

14. The composition of claim 12, wherein the composition is an aqueous dispersion having a concentration of 0.5 to 2.0% by weight of the polyaniline/second polymer complex, based upon the total weight of the aqueous dispersion.

15. The composition of claim 12, wherein the polyaniline contains at least 50 of the monomer units.

16. The composition of claim 12, wherein the second polymer is selected from styrene and substituted styrene sulfonic acid polymers; sulfonated vinylaromatic polymers; vinyl sulfonic acid polymers; sulfonated acrylate polymers; sulfonated methacrylate polymers and copolymers on or more of styrene and substituted styrene sulfonic acid polymers; sulfonated vinylaromatic polymers; vinyl sulfonic acid polymers; sulfonated acrylate polymers; sulfonated methacrylate polymers.

17. The composition of claim 12, wherein the second polymer is selected from poly(styrenesulfonic acid), poly (2-methylstyrene sulfonic acid), poly(4-phenylstyrene sulfonic acid), and sulfonated poly(alpha-vinyl naphthalene); poly (vinyl sulfonic acid); sulfonated poly(vinyl benzoate); sulfonated poly(benzyl acrylate) and sulfonated poly(benzyl methacrylate).

18. An organic electronic device having at least one layer comprising a polyaniline complexed with a second polymer having a high molecular weight, the polyaniline having monomer units, each of the aniline monomer units having a formula selected from Formula III below and Formula IV below, the second polymer having Formula II below:

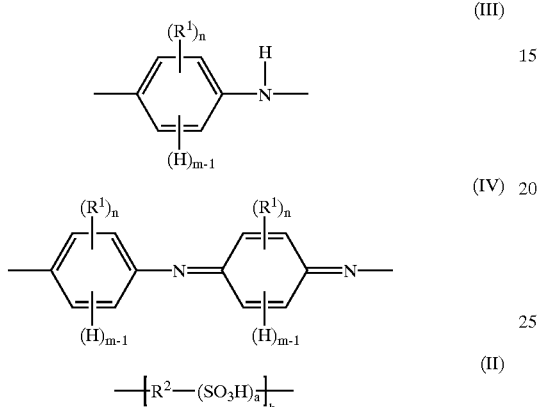

where in Formulae III and IV:

n is an integer from 0 to 4;

m is an integer from 1 to 5, with the proviso that n+m=5; and $R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms;

and where in Formula II:

R2 is a polymeric unit selected from styrene, substituted styrene, vinyls, vinyl aromatics, acrylates, methacrylates, and combinations thereof, a is an integer from about 1 to about 10; and b is a number sufficient to give a molecular weight greater than 100,000.

19. The device of claim 18, wherein the polyaniline contains at least 50 of the monomer units.

20. The device of claim 18, wherein the second polymer is selected from styrene and substituted styrene sulfonic acid polymers; sulfonated vinylaromatic polymers; vinyl sulfonic acid polymers; sulfonated acrylate polymers; sulfonated methacrylate polymers and copolymers on or more of styrene and substituted styrene sulfonic acid polymers; sulfonated vinylaromatic polymers; vinyl sulfonic acid polymers; sulfonated acrylate polymers; sulfonated methacrylate polymers.

21. The device of claim 18, wherein the second polymer is selected from poly(styrenesulfonic acid), poly(2-methylstyrene sulfonic acid), poly(4-phenylstyrene sulfonic acid), and sulfonated poly(alpha-vinyl naphthalene); poly (vinyl sulfonic acid); sulfonated poly(vinyl benzoate); sulfonated poly(benzyl acrylate) and sulfonated poly(benzyl methacrylate).

22. An organic electronic device comprising an anode layer (110); a conductive layer (120); an organic active layer (130); and a cathode layer (150); wherein the conductive layer (120) comprises a polyaniline complexed with a second polymer having a high molecular weight, the polyaniline having monomer units each having a formula selected from Formula III below and Formula IV below, the second polymer having Formula II below:

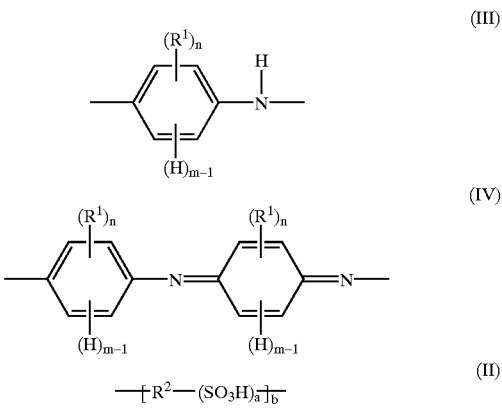

where in Formulae III and IV:

n is an integer from 0 to 4;

m is an integer from 1 to 5, with the proviso that n+m=5; and $R^1$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms;

and where in Formula II:

$R^2$ is a polymeric unit selected from styrene, substituted styrene, vinyls, vinyl aromatics, acrylates, methacrylates, and combinations thereof;

a is an integer from about 1 to about 10; and b is a number sufficient to give a molecular weight greater than 100,000.

23. The device of claim 21, wherein the organic active layer is a light-emitting layer.

24. The device of claim 21, wherein the conductive layer has a conductivity of from $10^{-8}$ S/cm to 10 S/cm.

25. The device of claim 21, further comprising a layer (140) between the organic active layer and the cathode to facilitate electron transport.

26. The device of claim 25, wherein the layer (140) is selected from tris(8-hydroxyquinolato)aluminum; phenanthroline-based compounds, such as 2,9-dimethyl-4,7-diphenyl-1,10-phenanthroline; 4,7-diphenyl-1,10-phenanthroline (DPA); 2-(4-biphenylyl)-5-(4-t-butylphenyl)-1,3,4-oxadiazole; and 3-(4-biphenylyl)-4-phenyl-5-(4-t-butylphenyl)-1,2,4-triazole.

27. The device of claim 21, wherein the polyaniline contains at least 50 of the monomer units.

28. The device of claim 21, wherein the second polymer is selected from styrene and substituted styrene sulfonic acid polymers; sulfonated vinylaromatic polymers; vinyl sulfonic acid polymers; sulfonated acrylate polymers; sulfonated methacrylate polymers and copolymers on or more of styrene and substituted styrene sulfonic acid polymers; sulfonated vinylaromatic polymers; vinyl sulfonic acid polymers; sulfonated acrylate polymers; sulfonated methacrylate polymers.

29. The device of claim 21, wherein the second polymer is selected from poly(styrenesulfonic acid), poly(2-methylstyrene sulfonic acid), poly(4-phenylstyrene sulfonic acid), and sulfonated poly(alpha-vinyl naphthalene); poly(vinyl sulfonic acid); sulfonated poly(vinyl benzoate); sulfonated poly(benzyl acrylate) and sulfonated poly(benzyl methacrylate).

30. The device of claim 21, wherein the conductive layer (120) comprises a complex made by the process of claim 1.

* * * * *